United States Patent
Klein

[15] 3,678,382
[45] July 18, 1972

[54] MALFUNCTION DETECTION CIRCUIT AND METHOD

[72] Inventor: Robert I. Klein, Hialeah, Fla.

[73] Assignee: Coulter Electronics, Inc., Hialeah, Fla.

[22] Filed: April 9, 1970

[21] Appl. No.: 27,007

[52] U.S. Cl. .................................................324/140 R
[51] Int. Cl. ..............................................G01r 7/00
[58] Field of Search.....................324/140; 328/147; 340/172

[56] References Cited

UNITED STATES PATENTS 3,420,993  1/1969  Chamberlain et al..............328/147 X

*Primary Examiner*—Alfred E. Smith
*Attorney*—Silverman & Cass

[57] ABSTRACT

In order to detect a malfunction in one or both of two parallel channels carrying the same data, in a dynamic manner, the absolute differential value of the outputs of these two channels is determined and such absolute differential value is compared with a threshold value which is a pre-selected percent of the average value of the output from the two channels. If the absolute differential value is less than the threshold value, the average output is coupled to an output line; however, whenever the absolute differential value exceeds the threshold value, all data is rejected and there is no output.

11 Claims, 1 Drawing Figure

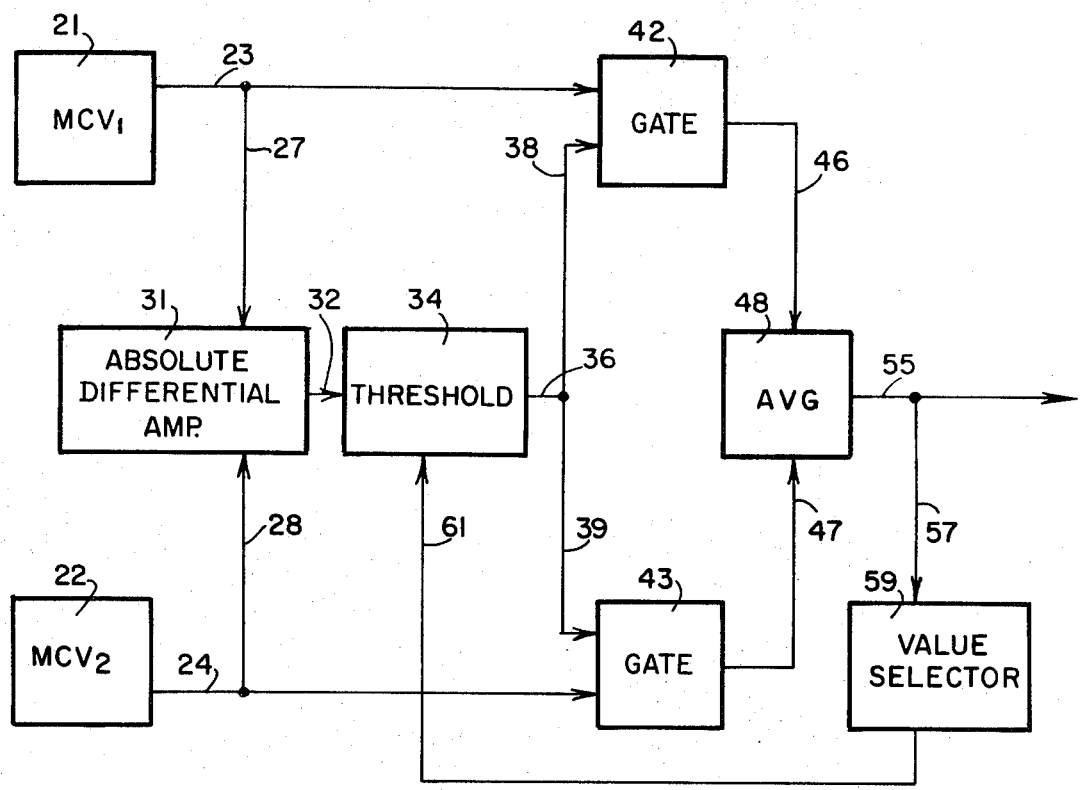

3,678,382

MALFUNCTION DETECTION CIRCUIT AND METHOD

BACKGROUND OF THE INVENTION

This invention relates to malfunction detection methods and circuitry and, more particularly, to the detection of the malfunctioning of at least one of two channels which contain the same output information.

In the collection of data from a plural channel system, there are instances when a plurality of the channels contain, or at least are supposed to contain, the same data which is progressively accumulating at the same rate. If there are more than two channels, exclusion or voting procedures and circuitry can be employed so as to detect a malfunctioning channel. One form of such detecting method and apparatus is taught in U.S. Pat. No. 3,444,463 issued to the Assignee of this application.

In the event that there are only two channels, the malfunction detection taught in the above cited patent could not be employed. Moreover, since the channels to be compared are dynamically progressing in their accumulated values, they should not be compared with any fixed or arbitrary value, deviation from which would indicate malfunction.

Of particular interest to a preferred embodiment of this invention is the dynamic measurement of mean corpuscular volume of blood cells. In such embodiment, a pair of mean corpuscular volume or MCV meters form the end points of a pair of parallel channels, the values of which are to be averaged for readout purposes. In the event that either channel attains a malfunction condition, there is no simple manner for detecting which channel is malfunctioning. Accordingly, all MCV test results should be discarded.

SUMMARY OF THE INVENTION

Accordingly, it is a primary object of this invention to provide method and circuitry by which a malfunction in one of two parallel circuits can be detected and the output from these circuits be discarded.

Another object of this invention is to provide means whereby the absolute difference in the outputs of two parallel circuits is compared with a fraction of their average value for determination of a malfunction.

To achieve the above in other objects and overcome the deficiencies in the prior art, the invention provides method and circuitry exemplified by an absolute differential amplifier coupled to the outputs of two MCV meters, an averaging device coupled also to the outputs of the two MCV meters, and a value selector which feeds back a small percentage of the average value to determine a threshold for comparison with the absolute difference of the MCV values; whereby unfavorable comparison of the threshold value with the absolute differential value provides a reject condition which inhibits the outputs of the MCV meters from being forwarded to subsequent processing circuitry.

BRIEF DESCRIPTION OF THE DRAWING

The FIGURE illustrates, in block form, the circuitry of the invention.

DESCRIPTION OF THE PREFERRED EMBODIMENT

Referring now to the single figure, which illustrates a preferred embodiment of the invention, the end portion of a pair of parallel channels is shown containing the elements 21 and 22 in the form of blocks $MCV_1$ and $MCV_2$, which may be mean corpuscular volume meters as described in U.S. Pat. No. 3,473,010, and which measure the mean corpuscular volume values for a blood sample as explained heretofore. These MCV values are the electric signals which are to be examined by the apparatus according to the invention with a view to finding out whether the difference between the signals is so great that a malfunction in the MCV meters or, more likely, in the portions of channels ahead of those elements is indicated.

It is to be noted that the mean corpuscular volume meters $MCV_1$ and $MCV_2$ represent only a preferred example of the form of data being processed, and the blocks 21 and 22 could supply any signal values which are to be compared.

The output of $MCV_1$ is connected over leads 23 and 27 to the input of an absolute differential amplifier block 31 which can be a conventional differential amplifier cascaded with an absolute value circuit at its output. The output of $MCV_2$ is connected over leads 24 and 28 to another input of the absolute differential amplifier 31. The output of $MCV_1$ is further connected through the lead 23 to a gate 42. The output of $MCV_2$ likewise is connected through the lead 24 to another gate 43.

The output of the absolute differential amplifier 31 is connected over the lead 32 to the input of a threshold circuit 34 which is constructed to send out a reject signal in the event that the differential value coming from the absolute differential amplifier 31 is greater than a certain acceptable value, particulars of which will be explained hereinafter.

The reject signal travels over a line 36 and branches out from there to the two gates 42 and 43 over leads 38 and 39, respectively. The MCV value outputs on lines 46 and 47, respectively, of the gates 42, 43, when not blocked or rejected are connected to the inputs of an averaging device 48.

The output of the averaging device is connected over leads 55 and 57 to the input of a value selecting device 59 which, in any conventional manner, functions so as to select a certain proportion, for example two percent, of the averaged signal produced in the averaging device 48. This selected signal value is fed back over a lead 61 to an input of the threshold circuit 34. The value selecting device 59 may be a voltage divider which can be adjusted by a potentiometer. However other forms of selector may be used instead.

It is readily noted that the two MCV meters 21, 22 and the gates 42, 43 are positioned in parallel branches 23 and 24 of the electric circuit. The absolute differential amplifier 31 is arranged in a bridging position between the branches 23 and 24, and analogously, the averaging device 48 is bridging the gates 42 and 43, thereby terminating the two-way system. On the right hand side of the averaging device 48, only one line 55 is provided, being an output line. The output line 55 may go to a further processing and/or recording station.

The threshold circuit 34 is in series connection with the amplifier 31, while the reject signal 36, 38 and 39 connects the threshold circuit 34 in a branching manner with the gates 42 and 43. The selecting or proportioning device 59 has its output connected over the feedback line 61 to the input of threshold circuit 34.

In operation, the two signals produced in the MCV meters 21, 22 are compared in the absolute differential amplifier 31 and the differential value of the two signals is transmitted to the threshold circuit 34 as an input signal.

The two MCV signals are also conveyed from the MCV meters 21, 22 to the normally conducting gates 42, 43 and from there to the averaging device 48. The average value is then transferred over the leads 55 and 57 to the proportioning device 59 where a value of, for instance, two percent of said average is extracted and conducted over feedback line 61 to the threshold circuit to form the threshold value. Hence, the two percent of the average value is imposed as a maximum threshold for the differential values arriving from the absolute differential amplifier. As a result, any differential value of the two signals exceeding the maximum of two percent of the average of the two signals will cause a reject signal to be sent out to the two gates, which will then cause a blocking of any signals from the MCV meters to the output line 55.

Since the system input or MCV values are dynamic, their average and thus the proportional value output on feedback line 61 also will be dynamic and related to each of the MCV values. In this manner, the absolute differential value is being compared with a dynamic condition value and not a static or fixed value determined by an arbitrary precondition.

It is believed that the foregoing adequately will enable those skilled in the art to appreciate and practice this invention and, if necessary, make modifications which would fall within the scope of the invention as defined by the accompanying claims.

What is sought to be protected by United States Letters Patent is:

1. An electric circuit for automatically ascertaining differential values between a first electric signal and a second electric signal and for excluding both said signals when they cause a differential value which exceeds a predetermined maximum differential value, comprising:

first means for ascertaining the magnitude of the first signal;

second means for ascertaining the magnitude of the second signal, said second means being disposed logically parallel in said circuit relative to said first means;

means connected to the outputs of said first and second means for measuring the differential value of the first and second signals;

means connected to the output of said differential measuring means for establishing a predetermined acceptable maximum for said differential value, said maximum establishing means being capable of producing a reject signal upon receipt of a differential value exceeding said acceptable maximum value;

means coupled to the outputs of said first and second magnitude ascertaining means for determining the average of said first and second signals; and means connected to the output of said average determining means for selecting a predetermined proportion of said average, and having its output connected to an input of said maximum value establishing means for employing the said proportion of the average as the maximum acceptable differential value;

whereby when a differential value of the first and second signals exceeds said maximum acceptable differential value, said maximum establishing means sends said reject signal for blocking passage of any signals from said average determining means.

2. Apparatus as set forth in claim 1, wherein
the means for measuring the differential value of the first and second signals is an absolute differential amplifier.

3. Apparatus as set forth in claim 1, wherein
the means for establishing a predetermined maximum for the differential value is a threshold circuit.

4. Apparatus as set forth in claim 1 and further including
first gate means having inputs connected to the outputs, respectively, of the first means for ascertaining the magnitude of the first signal and the means for establishing said predetermined acceptable maximum, and second gate means having inputs connected to the outputs, respectively, of the second means for ascertaining the magnitude of the second signal and the means for establishing said predetermined acceptable maximum, the outputs of the first and second gate means being connected to the input of said average determining means, whereby said reject signal causes said first and second gate means to block said signals from being received by said average determining means.

5. Apparatus as set forth in claim 1, wherein
the first and second means for ascertaining the magnitude of the first and second signals are mean corpuscular volume meters.

6. Apparatus as set forth in claim 5, wherein
said average determining means is a mean corpuscular volume average meter.

7. Apparatus as set forth in claim 6, wherein
said proportion selecting means is arranged and adapted to select from the value prevalent at said average meter an amount equal to a small percent thereof for transmitting same to the maximum value establishing means, and establishing same as the maximum acceptable differential value.

8. Apparatus as set forth in claim 6, wherein
the means for measuring the differential value of the first and second signals is an absolute differential amplifier, the means for establishing a predetermined maximum for the differential value is a threshold circuit, and there are further included;

first gate means having inputs connected, respectively, to the outputs of the first means corpuscular volume meter and the threshold circuit, and second gate means having inputs connected, respectively, to the outputs of the second mean corpuscular volume meter and the threshold circuit, whereby said reject signal sent out by said threshold circuit to said first and second gate means causes blockage of any signals.

9. A method for ascertaining differential values between a first electric signal and a second electric signal and for blocking transmission of those signals when they cause a differential value which exceeds a predetermined acceptable maximum differential value, comprising the steps of:

ascertaining the magnitudes of the first and second signals and measuring their differential value, determining the average of said first and second signals, selecting a predetermined proportion of said average, establishing said selected proportion of said average as an acceptable maximum value for said differential value, comparing the selected proportion with the differential value, providing a reject signal when the differential value exceeds said acceptable maximum value, and employing the reject signal for blocking the first and second signals from being transmitted relative to said average determining.

10. A method as set forth in claim 9 including
applying the first and second signals to conditional blocking stations for said blocking and blocking said first and second signals upon the arrival of said reject signal at the blocking stations.

11. A method as set forth in claim 9 wherein
said selecting is only of a small percentage of said average and said comparing is accomplished by establishing said small percentage as a threshold value.

* * * * *